Patented Nov. 18, 1930

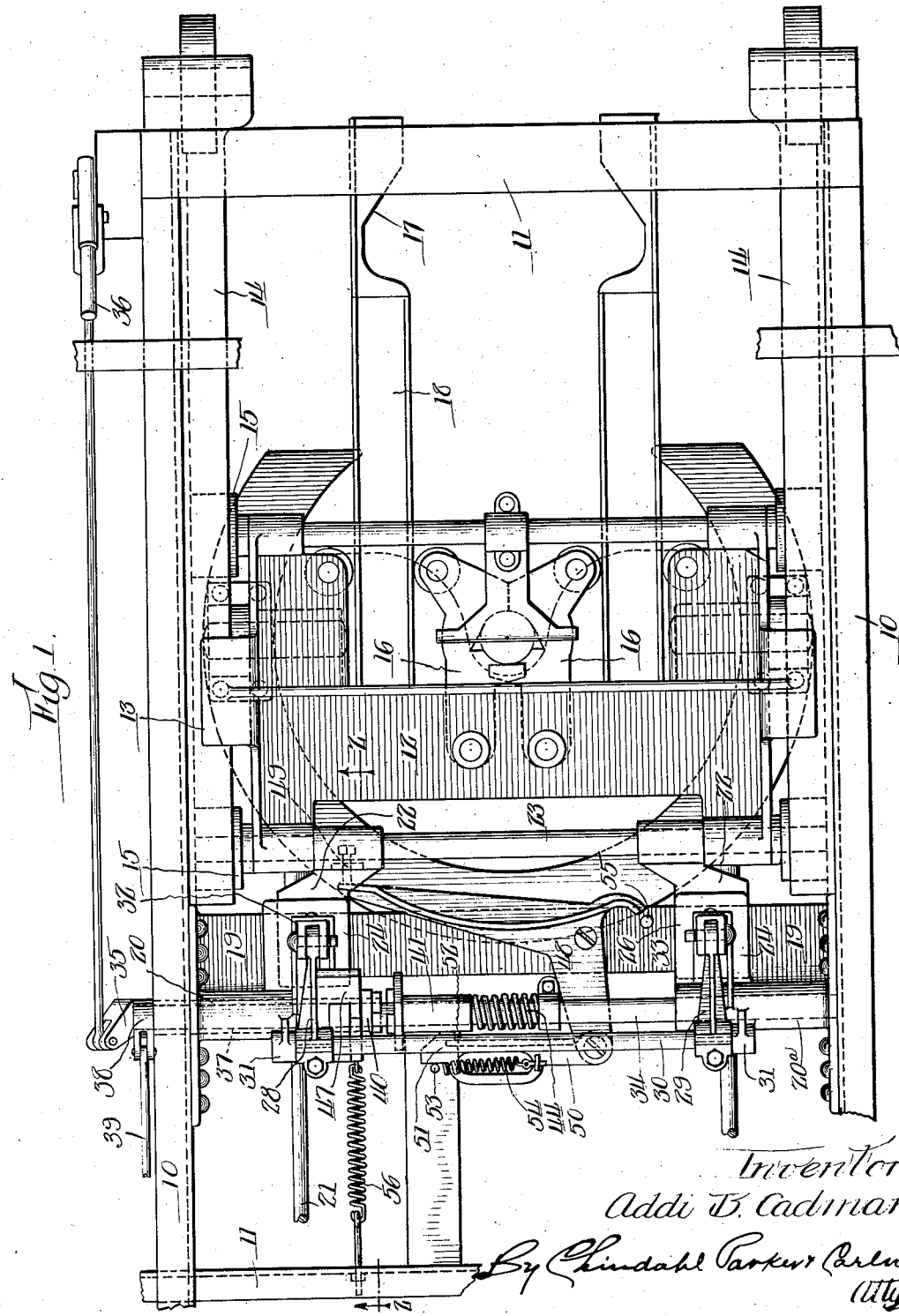

1,782,116

UNITED STATES PATENT OFFICE

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN

TRAILER VEHICLE

Application filed August 16, 1926. Serial No. 129,393.

My invention relates to vehicles having tractor and trailer sections, and more particularly to those vehicles in which the power resulting from the relative movement between the tractor and trailer sections is utilized to operate various auxiliary mechanisms, such as the supporting legs of the trailer. In vehicles of this kind, it is the practice to provide some sort of slidable element or carriage on the trailer which is moved back and forth in the coupling operations to transmit the power of the tractor to the mechanism to be operated.

The object of the present invention is to provide a vehicle of the above type having a slidable element mounted on its trailer section and a new and improved means for locking said element against movement in the trailer frame.

Stated more specifically, the invention aims to provide a trailer having a horizontally movable carriage and locking pins mounted on the trailer for vertical movement and arranged to be projected into and out of engagement with the carriage whereby to control the movements of the carriage.

Other objects and advantages of the invention will become apparent from the following description taken in connection with the accompanying drawings in which:

Figure 1 is a fragmentary plan view of the forward end of a trailer vehicle embodying the features of my invention and showing the parts in coupled relation.

Fig. 2 is a section taken along the line 2—2 of Fig. 1.

Fig. 3 is a fragmentary plan view similar to Fig. 1 showing the parts in partially uncoupled relation.

Fig. 4 is a section along the line 4—4 of Fig. 3.

While I have shown in the drawings and will herein describe the preferred embodiment of the invention, it is to be understood that I do not intend thereby to be limited to the particular form disclosed, but aim to cover all modifications and alternative constructions falling within the spirit and scope of the invention as expressed in the appended claims.

The present invention is illustrated in conjunction with a vehicle of the semi-trailer type comprising generally a frame constructed of longitudinally extending channel bars 10 and cross bars 11 and a slidable element or coupling carriage 12 mounted between the bars 10 at the forward end of the frame. A trailer of this type is generally adapted to be supported at its forward end upon the rear end of a tractor (not shown) and to be disconnected from the tractor to permit independent operation of the tractor.

The coupling carriage shown herein and described in detail in my prior application Serial No. 92,428, filed March 5, 1926, comprises, briefly, a rectangularly-shaped casting having wings 13 which rest upon inturned flanges 14 on the bars 10 and wheels 15 which roll along the under side of the flanges 14 and sustain the weight of the trailer upon the tractor. Thus the carriage is adapted to slide freely in the trailer frame. Such trailer-tractor combination is claimed in my co-pending application Serial No. 661,376, filed September 7, 1923.

To provide suitable means for connecting the carriage 12 and the tractor together, two horizontally swingable jaws 16 are pivoted on the carriage, and in the forward or uncoupled position of the carriage, the jaws are spread apart in recesses 17 of stationary bars 18 in position to receive the tractor king pin (not shown). As the tractor is backed under the trailer during coupling, the king pin cams the jaws together and then moves the carriage rearwardly until the rear wheels of the carriage strike against stops 19 formed on two opposed bearing brackets 20 and 20ª which brackets are secured against the inner sides of the channel bars 10. In this position of the carriage, the jaws are held closed about the tractor king pin by the bars 18 acting as cams on the free ends of the jaws. In detaching the tractor from the trailer, the carriage moves forwardly with the tractor until the jaws reach the recesses 17 whereupon the jaws spread apart automatically, thereby disconnecting the carriage from the king pin.

Such back and forth movement of the carriage may be utilized to actuate various mechanisms on the trailer. For example, rigid rods 21 extending rearwardly from the carriage may be provided to transmit the motion of the carriage to a landing mechanism (not shown) such as is commonly used to support the forward end of the trailer when detached from the tractor.

The present invention is intended primarily as a means for locking the carriage 12 in its rearmost or coupled position so that the tractive force exerted on the carriage by the tractor will be transmitted to the trailer frame. To this end, two horizontal tail-pieces 22 are keyed to a fixed axle 23 on the carriage in position to pass beneath horizontally extending lugs 24 as the carriage approaches its coupled position, the lugs 24 being integrally formed on the bearing brackets 20 and 20ª. Each tail-piece 22 is formed with a vertical opening 25 which coincides with an opening 26 in the corresponding lug 24 when the carriage is in its rearmost position. To lock the tail pieces to the lugs 24, two solid metal locking pins 27 are mounted on the trailer frame for vertical movement through the alined openings 25 and 26. For this purpose, the pins 27 are pivotally connected to the free ends of crank arms 28 and 29 keyed to a rock shaft 30 which may be journaled in bearing lugs 31 formed on the brackets 20 and 20ª. The free end of each pin is received by and guided in an annular rib 32 upstanding from each lug 24 and having a downwardly tapering inner surface. Downward movement of the pins is limited in the present instance by a cross piece 33 on the trailer frame. Thus, it will be observed that during the combined operation of the tractor and trailer the pull of the tractor on the carriage will be applied to the locking pins 27 (see Fig. 2), and transmitted to the trailer frame through the lugs 24.

Means is provided for lifting the locking pins out of the openings in the tail pieces 22 so as to permit uncoupling of the tractor and trailer. In the present embodiment, this means includes a transverse rock shaft 34 carrying a crank 35 which is adapted to be oscillated by a hand lever 36 mounted on the forward end of the trailer frame and equipped with suitable detent holding means. One end of the shaft is journaled in a tubular portion of the bearing bracket 20ª while the other end is journaled in a sleeve 37 which in turn has bearing in a tubular portion of the bracket 20. The outer end of the sleeve carries a crank 38 which may be connected to the trailer brakes (not shown) by a rod 39.

The sleeve 37 and the shaft 34 are adapted to be connected for conjoint oscillation in one direction by means of a clutch having a driven element 40 fixed to the inner end of the sleeve and a driving element 41 splined on the shaft 34. The opposed faces of the elements have teeth 42 and 43 with perpendicular surfaces which interengage when the shaft is rotated in a clockwise direction. A compression spring 44 on the shaft tends to hold the elements engaged.

Projecting radially from the outer end of the driven clutch element 40 is a cam tooth 45 having a surface 46 which works against the under side of a curved rib 47 integrally formed on the crank arm 28 and projecting laterally therefrom. Thus, when the element 41 is rotated clockwise from the position shown in Fig. 2 by the forward oscillation of the hand lever 36, the cam will press the rib forwardly thereby raising the crank 28 and lifting the locking pins out of the openings 25 so as to free the carriage for forward movement in the trailer frame.

A trigger mechanism of the type described in my said application may be employed to disengage the clutch elements automatically at the completion of the coupling stroke of the carriage, thereby permitting the expanding spring mechanism of the brake to cause counter-clockwise movement of the driven clutch element 40 so that the pins 27 will be projected downwardly through the tail-pieces 22. This mechanism comprises briefly a bell-crank 48 pivoted on the cross bar 33 and having one end positioned in the path of an adjustable tripping screw 49 on the carriage. The other arm of the bell-crank is connected to a member 50 having a hooked head 51 arranged to engage a lug 52 on the clutch element 41. The member 50 is guided by a pin 53 and is pressed outwardly by a spring 54, such movement being limited by a stop pin 55.

At the beginning of the operation of coupling the tractor and trailer together, the clutch elements will be positioned as shown in Figs. 3 and 4, the locking pins being then in raised position. As the carriage approaches its rearmost position, the trip screw 49 will strike the bell-crank 48 and will move the member 50 to separate the clutch elements. After disengagement of the elements, the driven element 40 will be free to rotate counter-clockwise, which rotation will be effected by the force exerted by the trailer brakes which may be of the self contracting type. Then, the cam tooth 45 will be moved back into the position shown in Fig. 2, and the locking pins will be projected through the alined openings in the tail-pieces 22 by gravity or by a spring 56 acting between the trailer frame and a depending finger 57 formed on the crank arm 28. A boss 58, formed on the clutch element 40, is wedged against the finger 57 when the element 40 is rotated reversely after separation from the other element, the boss thereby serving to prevent removal of the locking pins during operation of the vehicle.

It will be apparent that I have provided an efficient and positive means for securely locking the slidable carriage against forward movement in the trailer frame.

I claim as my invention:

1. A trailer vehicle having, in combination, a frame, a carriage mounted on said frame to travel back and forth during coupling and uncoupling of the tractor and its trailer, tail-pieces projecting rearwardly from said carriage, each of said tail-pieces having an opening therein, members rigid with said frame and having openings which coincide with the openings in said tail-pieces when the carriage is in its rearmost position, crank-arms mounted on said frame, locking pins carried by said arms in position to enter said openings, and means to oscillate said arms to move said pins into and out of the openings in said tail-pieces.

2. A trailer vehicle having, in combination, a frame, a rock-shaft carried by said frame, a pair of crank arms fixed to said shaft, locking pins pivoted on said arms, an element slidably mounted on said frame and having openings to receive said pins, means on said frame for guiding said pins, and cam means for controlling the oscillation of said shaft whereby to move said pins into and out of said openings.

3. A trailer vehicle having, in combination, a frame, a locking pin mounted on said frame for endwise vertical movement, guide means for said pin, an element mounted on said frame to travel back and forth, said element having an opening for receiving said locking pin when the element is in its rearmost position, hand-operated means for removing said pin from said opening, and means operated automatically by said element for rendering said hand-operated means ineffective whereby to permit said pin to be projected into said opening.

4. A trailer vehicle having, in combination, a frame, an element mounted in said frame for limited sliding movement, a pin mounted on said frame and arranged to be moved into and out of engagement with said element whereby to lock the element against movement in the frame, means for releasably holding said pin in inactive position, and means actuated automatically by said element at one end of its travel to trip said holding means.

5. A combined vehicle of the character described comprising, in combination, a tractor, a trailer, a coupling element mounted on the trailer for engagement with the tractor and adapted to be moved back and forth on the trailer frame during coupling and uncoupling respectively, a pin mounted on said frame for vertical movement and normally tending to move in a direction to engage said element, means adapted to releasably hold said pin in inactive position, and means to render said holding means ineffectual when said element has moved into a position to be engaged by the pin.

In testimony whereof, I have hereunto affixed my signature.

ADDI BENJAMIN CADMAN.